(12) United States Patent
Peters et al.

(10) Patent No.: US 11,889,843 B2
(45) Date of Patent: Feb. 6, 2024

(54) SYSTEM AND A METHOD FOR PROCESSING POULTRY SLAUGHTER PRODUCTS

(71) Applicant: Marel Poultry B.V., Av Boxmeer (NL)

(72) Inventors: Erik Hendrikus Werner Peters, Av Boxmeer (NL); Ties Antoon Henricus Hoenselaar, Av Boxmeer (NL); Theodorus Cornelis Reijn, Av Boxmeer (NL)

(73) Assignee: Marel Poultry B.V., Av Boxmeer (NL)

( * ) Notice: Subject to any disclaimer, the term of this patent is extended or adjusted under 35 U.S.C. 154(b) by 0 days.

(21) Appl. No.: 18/256,826

(22) PCT Filed: Dec. 10, 2021

(86) PCT No.: PCT/NL2021/050754
§ 371 (c)(1),
(2) Date: Jun. 9, 2023

(87) PCT Pub. No.: WO2022/131908
PCT Pub. Date: Jun. 23, 2022

(65) Prior Publication Data
US 2023/0389560 A1   Dec. 7, 2023

(30) Foreign Application Priority Data

Dec. 16, 2020 (NL) .................................. 2027128

(51) Int. Cl.
*A22C 21/00* (2006.01)
(52) U.S. Cl.
CPC ................. *A22C 21/0053* (2013.01)
(58) Field of Classification Search
CPC .... A22C 21/0053; A22B 7/005; B65G 47/52; B65G 47/60

(Continued)

(56) References Cited

U.S. PATENT DOCUMENTS

| | | | | |
|---|---|---|---|---|
| 5,453,045 A | * | 9/1995 | Hobbel | A22C 21/0053 452/183 |
| 5,672,098 A | * | 9/1997 | Veraart | A22C 21/0053 452/183 |
| 2003/0134586 A1 | * | 7/2003 | Kvorning | A22C 21/0053 452/182 |

FOREIGN PATENT DOCUMENTS

| | | |
|---|---|---|
| EP | 0225306 A2 | 6/1987 |
| EP | 1205111 A1 | 5/2002 |

(Continued)

OTHER PUBLICATIONS

International Search Report issued in International Application No. PCT/NL2021/050754 dated Feb. 25, 2022 (4 pages).

(Continued)

*Primary Examiner* — Richard T Price, Jr.
(74) *Attorney, Agent, or Firm* — Osha Bergman Watanabe & Burton LLP (57) ABSTRACT

A system and method are provided for processing poultry slaughter products, the system comprising a first transport line, running at a first speed, and comprising successive first product carriers spaced apart at a first distance, each configured to carry a respective one of the products, a second transport line, running at a second speed, and comprising successive second product carriers spaced apart at a second distance, each configured to carry a respective one of the products, and a product transfer device for successively transferring products from first to second product carriers. The product transfer device is configured such that it each time successively transfers a predefined plurality of products, wherein a location of transfer of a subsequent product of the plurality of products is each time more upstream or more downstream along the first transport line than the location of transfer of a previous product of the plurality of products.

14 Claims, 7 Drawing Sheets

(58) Field of Classification Search
USPC .......................................................... 452/182
See application file for complete search history.

(56) References Cited

FOREIGN PATENT DOCUMENTS

| EP | 1848282 B1 | 2/2009 |
|---|---|---|
| WO | 02/44670 A1 | 6/2002 |
| WO | 2016/003271 A1 | 1/2016 |

OTHER PUBLICATIONS

Written Opinion issued in International Application No. PCT/NL2021/050754 dated Feb. 25, 2022 (9 pages).
Netherlands Search Report issued in Netherland Application No. NL 2027128 dated Aug. 30, 2021 (9 pages).

* cited by examiner

SYSTEM AND A METHOD FOR PROCESSING POULTRY SLAUGHTER PRODUCTS

With systems for processing poultry slaughter products, such as chicken slaughter products, there is a constant striving for higher processing speeds in order to thus be able to increase the production capacity. Such systems usually comprise a chain-like conveying member to which product carriers are attached, usually hooks, which carry the slaughter products. The slaughter products are in this case conveyed past processing stations in a continuous manner. Depending on the slaughter product to be processed and the processing stage, specific product carriers are required to carry the slaughter product in such a manner that it can be processed efficiently.

Such systems may comprise transfer locations where slaughter products are transferred, that is to say moved across, from a first product carrier, such as a hook, on a first transport line, such as a carousel or an overhead conveyor chain for example, to a second product carrier on a second transport line. This may be a relatively critical point with such a system. An insufficiently accurate mutual positioning of the product carriers during the transfer operation results in a higher error rate of the transfer of slaughter products and consequently to a higher downtime of the system, for example as a result of a slaughter product becoming jammed. In addition, this transfer is even more critical in case of increased conveying speeds or processing speeds.

Generally, in order to reliably transfer such slaughter products, a speed of the first and second transport lines as well as a distance between successive carriers on the first and second transport lines, i.e. the carrier pitch, are made equal. This way, successive carriers of the first transport line may be positioned directly besides carriers of the second line so that the products can be transferred. Such an equal speed and carrier pitch may however not be desired in all situations.

U.S. Pat. No. 5,453,045 discloses a poultry slaughter product processing system which has a transfer device capable of transferring products from a first to a second transport line which may have a different speed and spacing between adjacent shackles. In order to facilitate the product transfer, an intermediate accumulator is provided in the form of a buffer wheel having carriers slidably mounted thereto, so that products may be transferred from the first line to the buffer wheel and subsequently from the buffer line to the second line. There is room for improvement regarding the product transfer, however, in particular because such a processing system is quite complex.

WO 2016/003271 A1 also relates to the transfer of poultry products using a transfer wheel in between a first and second transport line, having the same or at least similar disadvantages as the system of U.S. Pat. No. 5,453,045.

WO 02/44670 A1 relates to a method and apparatus for weighing suspended poultry carcasses. Using an eccentric buffer wheel, a difference in shackle spacing between a first and a second line can be compensated for. Also such a system is quite complex.

It is an object of the invention to provide an improved system for processing poultry slaughter products. It is a further object of the invention to provide a system for processing poultry slaughter products, having a transfer device capable of effectively transferring slaughter products from a first transport line to a second transport line that may run at a different speed and/or may have a different carrier pitch. It is a still further object of the invention to provide a system for processing poultry slaughter products, having a transfer device capable of transferring products from a first transport line to a second transport line with less constructional demands on the transport lines.

One or more of the above objects are achieved by the processing system in accordance with a first aspect of the present invention, for processing poultry slaughter products, such as chicken slaughter products, the system comprising
  a first transport line, running in use at a first speed, and comprising successive first product carriers spaced apart at a first distance along the first transport line and each configured to carry a respective one of the products,
  a second transport line, running in use at a second speed, and comprising successive second product carriers spaced apart at a second distance along the second transport line and each configured to carry a respective one of the products,
  a product transfer device for successively transferring products from respective first product carriers to respective second product carriers,
  wherein the product transfer device is configured such that it each time successively transfers a predefined plurality of products, wherein a location of transfer of a subsequent product of the predefined plurality of products is each time more upstream or is each time more downstream along the first transport line than the location of transfer of a previous product of the predefined plurality of products.

An effect of the system according to the invention is that because of the inventive provision of the product transfer device providing the upstream or downstream moving location of transfer, a reliable transfer may be achieved in case of different speeds and/or different distances, i.e. pitches, between carriers on the first and/or second transport lines, and that without the necessity to use some intermediate buffer wheel or buffer station. That means, according to the invention poultry slaughter products may be directly transferred from respective first product carriers of a first transport line to respective second product carriers of a second transport line. Time intervals between each of the successive transfers of said predefined pluralities of products may be predefined in dependence on the first and/or second speed and/or on the first and/or second distance.

An additional effect is that with the system according to the invention, gaps may be created in the second transport line on purpose. A gap in a transport line means one or more, preferably one, empty carrier, i.e. not carrying a product, or, free from a product, in between carriers which each carry a product. For example, every tenth carrier in the line may be left empty (while the other carriers carry a product).

This may for example be achieved by letting the second transport line move at a higher speed than the first transport line, and optionally providing the second product carriers at a greater mutual distance than the first product carriers. With a system according to the invention, products can in that case still be reliably transferred by providing an upstream moving location of transfer, wherein a gap is created in between successive iterations, i.e. repetitions, of the successive transfer of a predefined plurality of products.

Such gaps in the second transport line may be of advantage during the further transport of the products on the second transport line, for example because it will be much easier to put fallen products (back) on the second transport line. With increasing speed difference between the first and second transport lines, for example, more such gaps may be realised.

A poultry slaughter product, such as a chicken slaughter product, may be an entire slaughtered animal, or a part or a combination of parts thereof.

In an embodiment, each of the successive transfers, i.e. iterations of the transfer, of a predefined plurality of products has an equal predefined plurality of products.

The predefined plurality of products may in embodiments be any number in the range from and including 2 products up to and including 20 products, preferably from and including 5 products up to and including 15 products.

In an embodiment, the location of transfer of a product of a subsequent predefined plurality of products is the same as the location of transfer of a product, having the same sequence number, of a preceding predefined plurality of products. Or, in other words, each iteration the products of a plurality of products are transferred at the same respective transfer locations. The product transfer device may thus have a plurality of transfer locations equal to said predefined plurality, each of the transfer locations being at a predefined, different position along the first transport line, respectively.

In an embodiment, the system is configured such that in use the second speed is higher than the first speed, wherein the product transfer device is configured such that a location of transfer along the first and second transport lines of a subsequent product of the plurality of products is each time more upstream than that of a previous one of the plurality of products. By doing so, gaps may be created in the second transport line in an effective manner.

The first transport line and the second transport line may be besides each other at least at the product transfer device. The first and second transport lines in use may run in the same direction. This way, the transfer of a product from a first to a second product carrier may be reliably effected.

In an embodiment the first transport line runs along a first path and the second transport line runs along a second path, wherein at least at said locations of transfer, the first and second paths are at a constant mutual distance. This also increases the reliable product transfer.

In an embodiment the product transfer device is configured such that during the transfer of each product of the plurality of products, the first carrier which carries that product is at least substantially besides a second carrier to which that product is to be transferred during the transfer. This also increases the reliable product transfer.

In an embodiment, at least at the transfer device, both the first and the second transport line follow a respective curved path, such as defined by a carrousel, preferably wherein the second transport line, and thus its curved path, is at an outer side of the first transport line.

In an embodiment, the second distance is greater than the first distance. By doing so, preferably in combination with the second speed being higher than the first speed, gaps may be created in the second transport line in an effective manner.

The speed of the second transport line may be in the range of 0.85 to 1.15, preferably 1 to 1.10, further preferably 1.05 to 1.10 times the speed of the first transport line.

In an embodiment, the product transfer device comprises a cam follower coupled to a transfer element for engaging a product for transferring it from a first to a second carrier, the system having a cam track through which the cam follower runs in use, wherein the cam track is configured to move the cam follower at the respective location of transfer so as to initiate the transfer of a product from a first to a second carrier at that location.

In an embodiment, the cam track has a predefined track section that moves the cam follower so as to initiate said transfer, wherein the system has a drive module configured to move the predefined track section, preferably together with the cam track itself, upstream or downstream along the first transport line during each successive transfer of a said predefined plurality of products in use.

In an embodiment, a cam follower is provided for each of the first carriers, and is connected thereto, and wherein further a transfer element is provided for each of the first carriers, and is connected thereto. So, in use the cam followers of respective successive first product carriers pass along said predefined track section and are moved by that track section so that a product is transferred by the transfer element coupled to that cam follower.

In an embodiment the product transfer device is arranged such that the predefined track section may be moved between an inactive position in which it remains free from cam followers that pass the track section to such an extent that the cam followers will not be engaged by the track section so as to transfer a product, and an active position in which it engages cam followers that pass the track section so as to transfer a product. Such movement of the predefined track section may be provided by mechanical means such as a further cam follower coupled to the track section, which follower runs through a further cam track, or by electrical or pneumatic means.

In an embodiment, the transfer element is configured to engage the product by a pushing action.

Alternatively the product transfer device may comprise one or more electrical or pneumatic actuators coupled to a transfer element, so as to initiate the transfer of a product from a first to a second carrier at the respective transfer location. For example, an electrically actuated solenoid may be provided on each first product carrier, coupled to a transfer element.

Corresponding embodiments are also applicable for the below described method according to the second aspect of the present invention. The system according to the first aspect of the present invention may be arranged for carrying out the method according to a second aspect of the invention.

In a second aspect, the invention provides a method for processing poultry slaughter products, preferably using a system according to the invention as described above. The method comprises transporting the products, using a first transport line running at a first speed and comprising successive first product carriers spaced apart at a first distance along the first transport line, wherein the products are each carried by a respective of the first product carriers, successively transferring, by a product transfer device, products from respective first product carriers to respective second product carriers of a second transport line running at a second speed, the second product carriers being spaced apart at a second distance along the second transport line, wherein during the step of transferring, each time a predefined plurality of products are successively transferred wherein a location of transfer of a subsequent product of the predefined plurality of products is each time more upstream or is each time more downstream along the first transport line than the location of transfer of a previous product of the predefined plurality of products.

In an embodiment, the second speed is higher than the first speed, wherein a location of transfer along the first and second transport lines of a subsequent product of the plurality of products is each time more upstream than that of a previous one of the plurality of products.

In an embodiment, each of the successive transfers of a predefined plurality of products has an equal predefined plurality of products.

In an embodiment of the system having the predefined track section as described above, during the step of transferring, the predefined track section is moved upstream or downstream, preferably upstream, along the first transport line during each successive transfer of a said predefined plurality of products.

Corresponding embodiments are also applicable for the above described system according to the first aspect of the present invention. Effects of the method according to the present invention are analogue to the effects of the system according to the invention as described above.

In general terms the present invention relates to a system and method for processing poultry slaughter products, the system comprising a first transport line, running at a first speed, and comprising successive first product carriers spaced apart at a first distance, each configured to carry a respective one of the products, a second transport line, running at a second speed, and comprising successive second product carriers spaced apart at a second distance, each configured to carry a respective one of the products, and a product transfer device for successively transferring products from first to second product carriers. The product transfer device is configured such that it each time successively transfers a predefined plurality of products, wherein a location of transfer of a subsequent product of the plurality of products is each time more upstream or more downstream along the first transport line than the location of transfer of a previous product of the plurality of products.

The present invention is described hereinafter with reference to the accompanying schematic drawings in which embodiments of the present invention are shown and in which like reference numbers indicate the same or similar elements.

FIGS. 3A-8B show, in top view, schematic representations of a part of an embodiment of a system according to the present invention, at different moments in time during use of the system.

Figure 1:
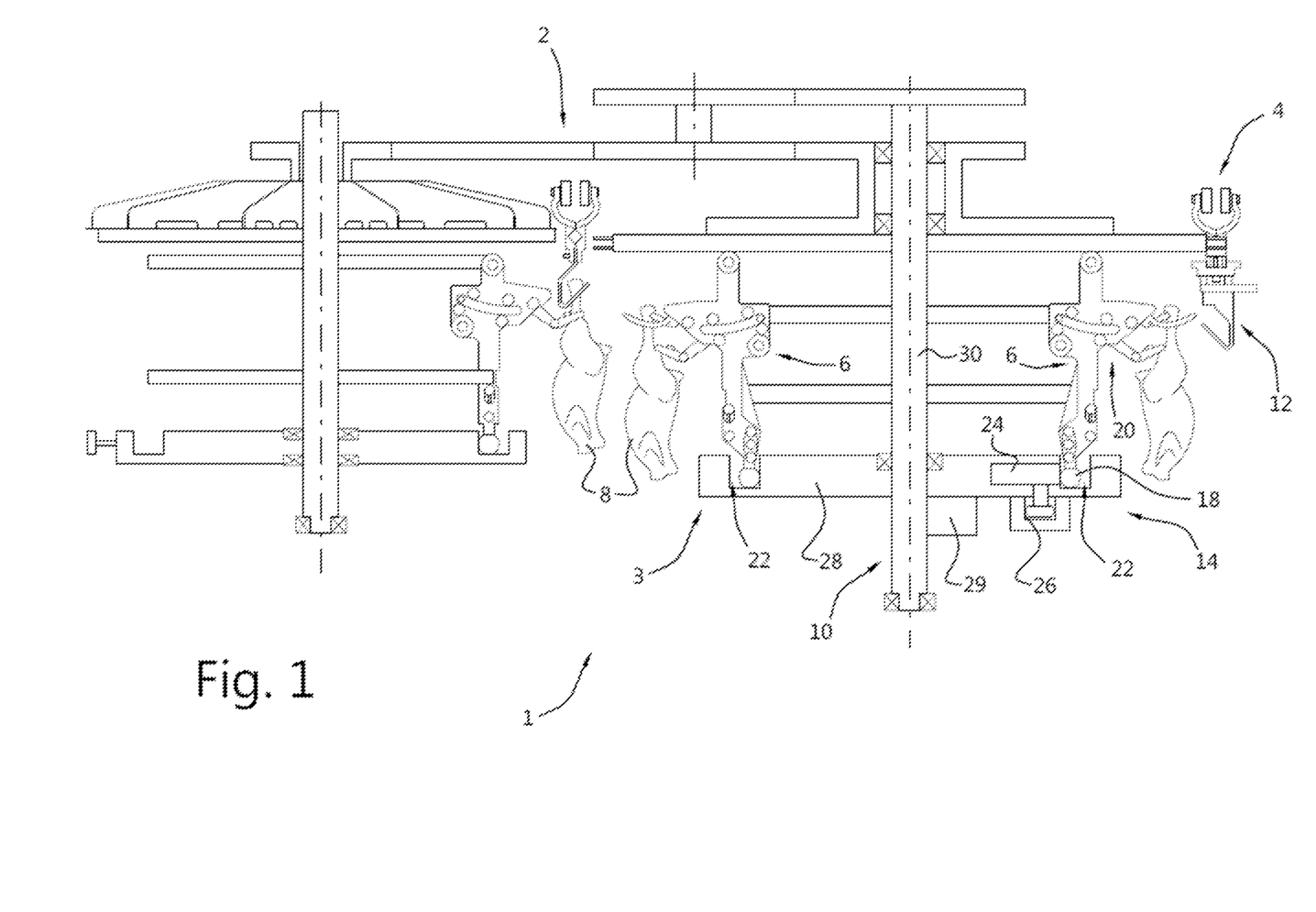
FIG. 1 shows, in front view, an embodiment of a system according to the invention.

FIG. 1 shows a system 1 for processing poultry slaughter products 8, in the present example chicken. The system 1 has a supply line 2, a first transport line 3 and a second transport line 4. The supply line 2 supplies chicken to the first transport line 3. The first transport line 3 comprises a carroussel 10 having a plurality of first product carriers 6 spaced apart at a first distance along its circumference. Each first product carrier 6 is configured to carry a respective one of the products 8. The first transport line 3 runs at a first speed in use.

The second transport line 4 runs at a second speed in use and comprises successive second product carriers 12 spaced apart at a second distance along the second transport line 4. Each second product carrier 12 is configured to carry a respective one of the products 8. As can be understood from the figures, both the first 3 and the second transport line 4 at least partly follow a curved path, wherein the first transport line 3 follows a circular path defined by the carrousel 10. The second transport line 4 is at an outer side of the first transport line 3 and runs along a curved path past the carroussel 10.

The system 1 also comprises a product transfer device 14 for successively transferring products 8 from respective first product carriers 6 to respective second product carriers 12. In use of the system 1 products are supplied to the first transport line 3, i.e. the carroussel 10, by the supply line 2. Then, products may be processed on the carroussel 10, such as by a cutting or trimming or deboning operation, for example. Then, products 8 are transferred from the first transport line 3 to the second transport line 4 by the product transfer device 14.

According to the invention, the product transfer device 14 is configured such that it each time successively transfers a predefined plurality of products 8, such as ten products, for example. As will be explained with reference to FIGS. 2-8B, a location of transfer of a subsequent product of the predefined plurality of products is each time more upstream along the first transport line 3 than the location of transfer of a previous product 8 of the predefined plurality of products 8 and the location of transfer of a product 8 of a subsequent predefined plurality of products 8 is the same as the location of transfer of a product 8, having the same sequence number, of a preceding predefined plurality of products 8. This implies that a second product of a plurality of ten products to be successively transferred is transferred at the same location along the first transport line 3 as a second product of a preceding plurality of ten products already successively transferred, and as a second product of a succeeding plurality of ten products still to be successively transferred.

The product transfer device 14 comprises a cam follower 18 coupled to a transfer element 20 for engaging a product 8 for transferring it from a first 6 to a second carrier 12. Such a cam follower 18 and transfer element 20 have been provided for each of the first carriers 6, and are connected thereto. The transfer element 20 may be a pusher to push a product out of a first carrier 6 and into a second carrier 12. The system 1 also has a cam track 22 through which the cam followers 18 run in use, wherein the cam track 22 is configured to cooperate with a cam follower 18 of a first carrier 6 at a respective location of transfer so as to initiate the transfer of a product 8 from that first carrier 6 to a second product carrier 12 at that location, by the transfer element 20. The cam track 22 has a predefined track section 24, such as a bulging section of the cam track, that moves the cam follower 18 and thereby the transfer element 20 so as to initiate said transfer. Other sections of the cam track 22 may keep the transfer element 20 in an inactive position. The system 1 has a drive module 29 configured to move the predefined track section 24 upstream or downstream along the first transport line 3 during the subsequent transfer of the plurality of products 8 in use. The track section 24 and cam track 22 of which the section 24 forms part are provided on a carroussel disc 28 rotatable about a central axis 30 of the carroussel 10. The disc 28 may be rotated at a different rotation speed and/or direction of rotation with respect to the rotation speed of the first carriers 6 and may be driven by a separate drive motor, or may be driven via a gearing, such as a planetary gearing, operative between a rotating part of the carroussel 10 and the disc 28 so as to rotate the disc 28 in dependence of the rotation of the first carriers 6 on the carroussel 10. This way, the cam track 22 and thus the track section 24 can be moved in an upstream direction or a downstream direction along the first transport line 3. Although in the present example products are first transferred from a supply line 2 to the first transport line 3 in the form of a carroussel, and then to the second transport line 4, other configurations of the first and second transport lines are also conceivable. For example, instead of first carriers being provided on a carroussel, the first carriers may also be suspended from an overhead conveyor chain, preferably running along a guidance wheel, like the supply line 2 in the example of FIG. 1.

In an embodiment of a method according to the invention, poultry slaughter products 8 are processed using the system 1 as described above. Using the first transport line 3, products 8, each carried by a respective of the first product carriers 6, are being transported. Products 8 are then successively transferred, by the product transfer device 14, from respective first product carriers 6 to respective second product carriers 12 of the second transport line 4. During the step of transferring, each time a predefined plurality of products are successively transferred wherein a location of transfer of a subsequent product of the predefined plurality of products is each time more upstream or is each time more downstream along the first transport line 3 than the location of transfer of a previous product of the predefined plurality of products.

Figure 2:
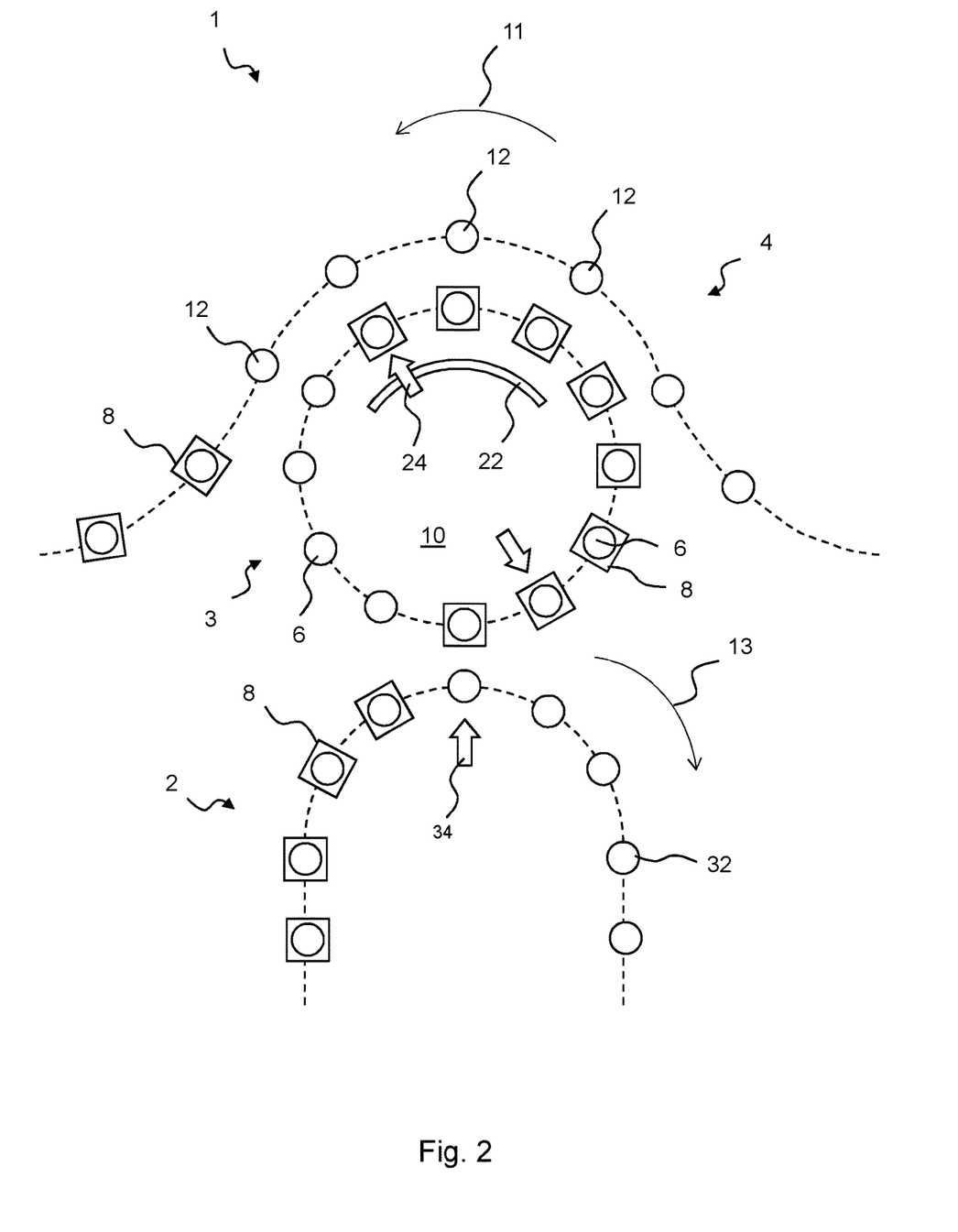
FIG. 2 shows, in top view, a schematic representation of the system according to FIG. 1.

This principle will now be further explained with reference to FIGS. 2-8B. FIG. 2 shows a schematic representation of the system 1 according to the invention. A representation of a carroussel 10 is shown, having a number of twelve first product carriers 6 spaced apart at its circumference. The carroussel 10 rotates counter clockwise (that means in the indicated direction 11) and forms, together with the first carriers 6, the first transport line 3. As shown, the second transport line 4 runs past the carroussel 10 and follows its circular circumference for a part thereof. The second product carriers 12 of the second transport line 4 move from right to left in the view of FIG. 2, so also in the indicated direction 11. The carriers 12 are at a greater mutual distance than the carriers 6. In use the line speed of the second transport line 4 is higher than that of the first transport line 3. Products on carriers are represented by the squares 8. Further, a supply line 2 is shown, rotating clockwise in the direction 13 and having product carriers 32 at the same mutual distance as the first product carriers 6. The supply line 2 runs at the same speed as the first speed of the first transport line 3, thus of the carroussel 10. As a result, products 8 can be transferred from the supply line 2 to the first product carriers 6 of the carroussel 10 using conventional transfer means, such as a pusher 34 operative at the location where carriers 32 and carriers 6 are closest and aligned radially, as shown in FIG. 2.

In the example, the second speed is higher than the first speed. Also, the second distance is greater than the first distance, as can be derived from FIG. 2. The system 1 has a circular cam track 22 (partly shown in FIG. 2). This cam track 22 is part of the disc 28 as described above. In use the disc 28 rotates clockwise, so in the opposite rotation direction of the direction of rotation 11 of the product carriers 6. The cam track 22 has a predefined track section 24, represented by the arrow in FIG. 2. As a result of the track section 24 thus also rotating clockwise, any cam followers 18 running in the cam track 22 may be engaged by the track section 24 at different locations so as to transfer a product 8 at the location where the track section 24 engages the cam follower 18.

Figure 3A:
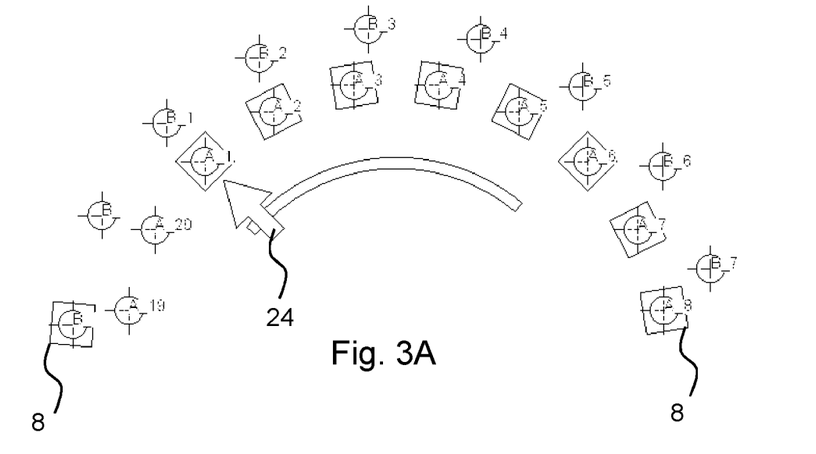
Figure 3B:
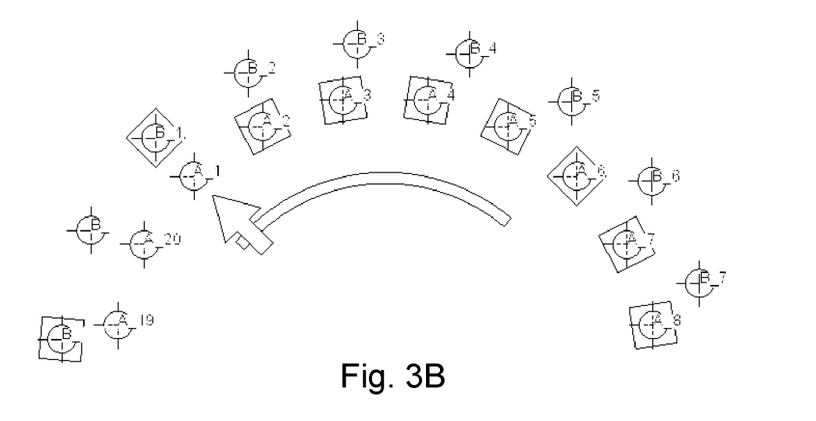
Figure 4A:
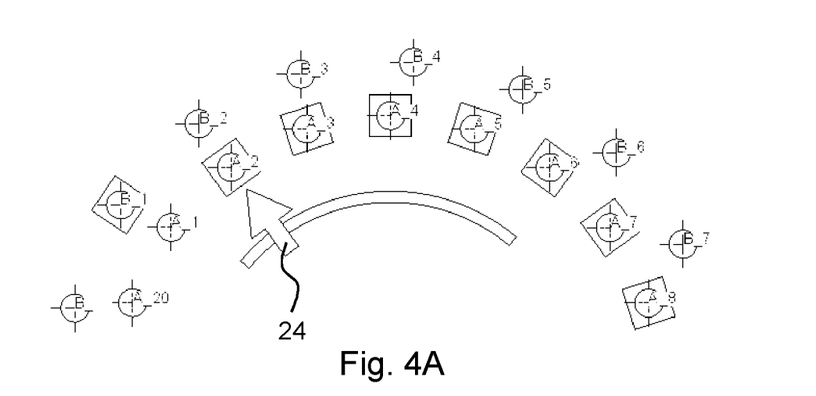
Figure 4B:
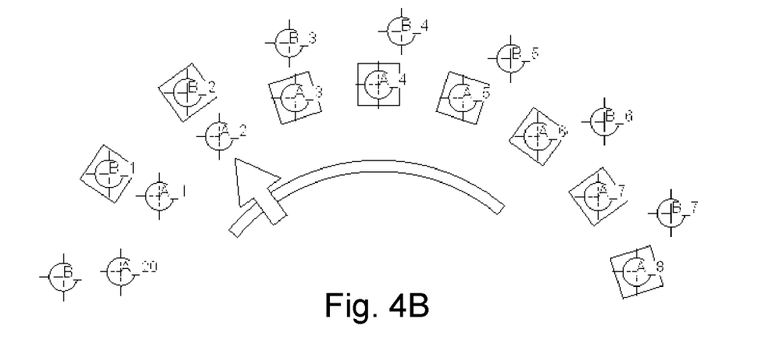
Figure 5A:
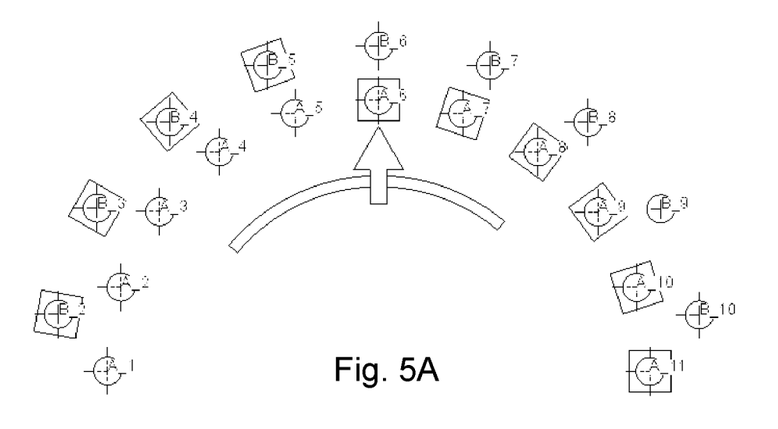
Figure 5B:
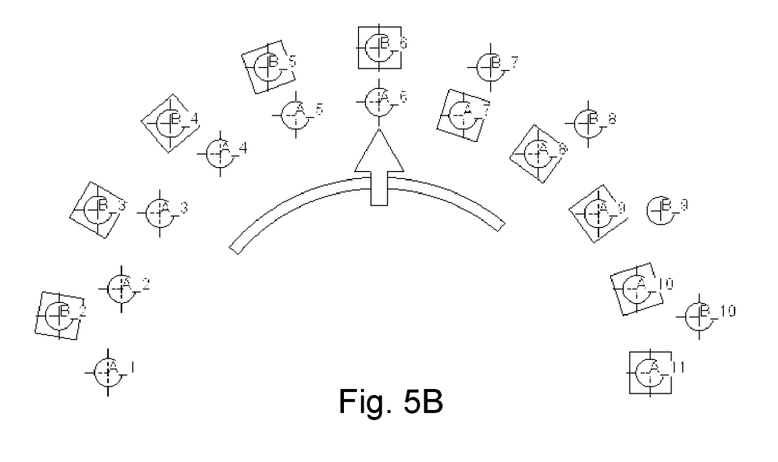
Figure 6A:
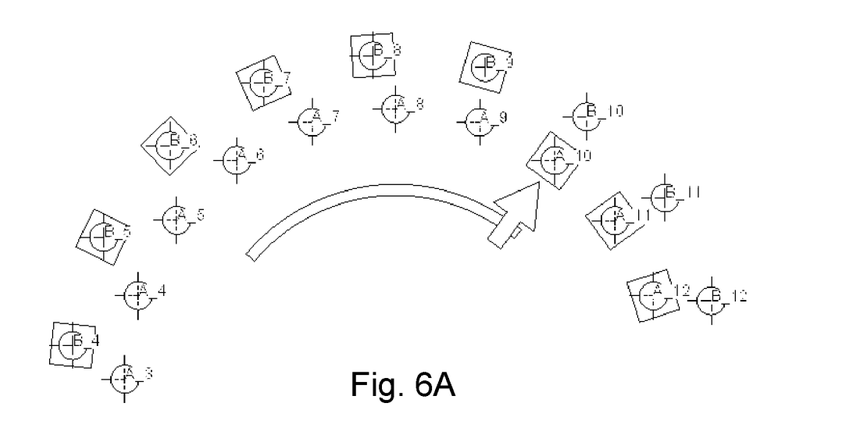
Figure 6B:
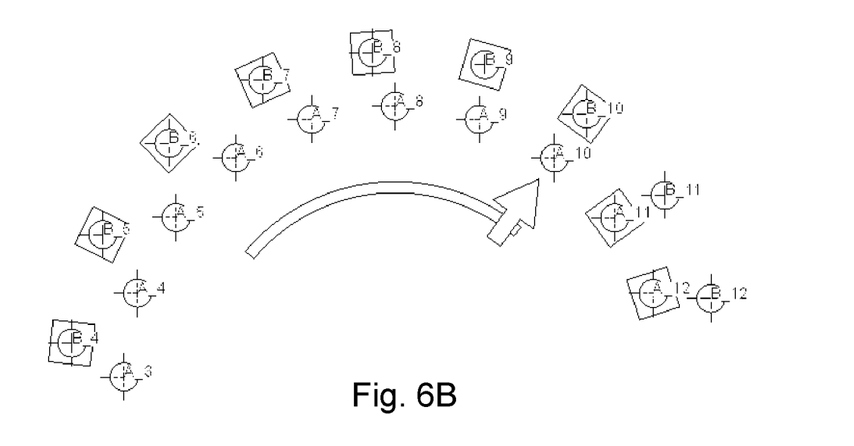

Reference is now made to FIGS. 3A-8B, starting from FIG. 3A each showing a later moment in time during use, that means, during the execution of an embodiment of a method according to the invention. In the example of these figures, a first transport line defined by a carroussel having a number of twenty first carriers A_1 to A_20 is represented. A second transport line having second product carriers having a label starting with B is represented. Generally, products 8 are being transferred from first carriers A to second carriers B. From FIG. 3A can be derived that at that displayed moment during use only carriers A_1 and B_1 are radially in line with each other so that (only) at the location of those carriers a product 8 can be reliably transferred. At that moment in time the predefined track section represented by arrow 24 is at (i.e. it passes) that, first, location. As shown in FIG. 3A, a first product 8 of a plurality of ten products to be successively transferred is present on carrier A_1 and carrier B_1 is empty. That first product 8 is then transferred at that location by the transfer device 14, in a manner as described above. As FIG. 3B shows, the product 8 has been transferred at the first location from carrier A_1 to carrier B_1. The first carriers A and the second carriers B continue moving counter clockwise while the predefined track section 24 moves clockwise, as the location of the arrow 24 indicates. FIGS. 4A and 4B show a successive transfer of a second product 8 of said plurality of products from carrier A_2 to carrier B_2 at a second location, upstream in the direction of movement of carriers A. As shown, at that moment in time, i.e. at that second location, carrier A_2 is radially in line with carrier B_2. FIGS. 5A and 5B show a further transfer at a sixt location (transfers at third to fifth location and related product transfer not shown), again upstream in the counter clockwise direction of movement of carriers A and B. As shown, at that moment, i.e. at that sixt location, carrier A_6 is radially in line with carrier B_6 and a sixt product of said plurality of products is transferred. FIGS. 6A and 6B show a further transfer, of a tenth product of the plurality of ten products, at a tenth, and final location (transfers at seventh to ninth location not shown), again upstream in the counter clockwise direction of movement of carriers A and B.

Figure 7:
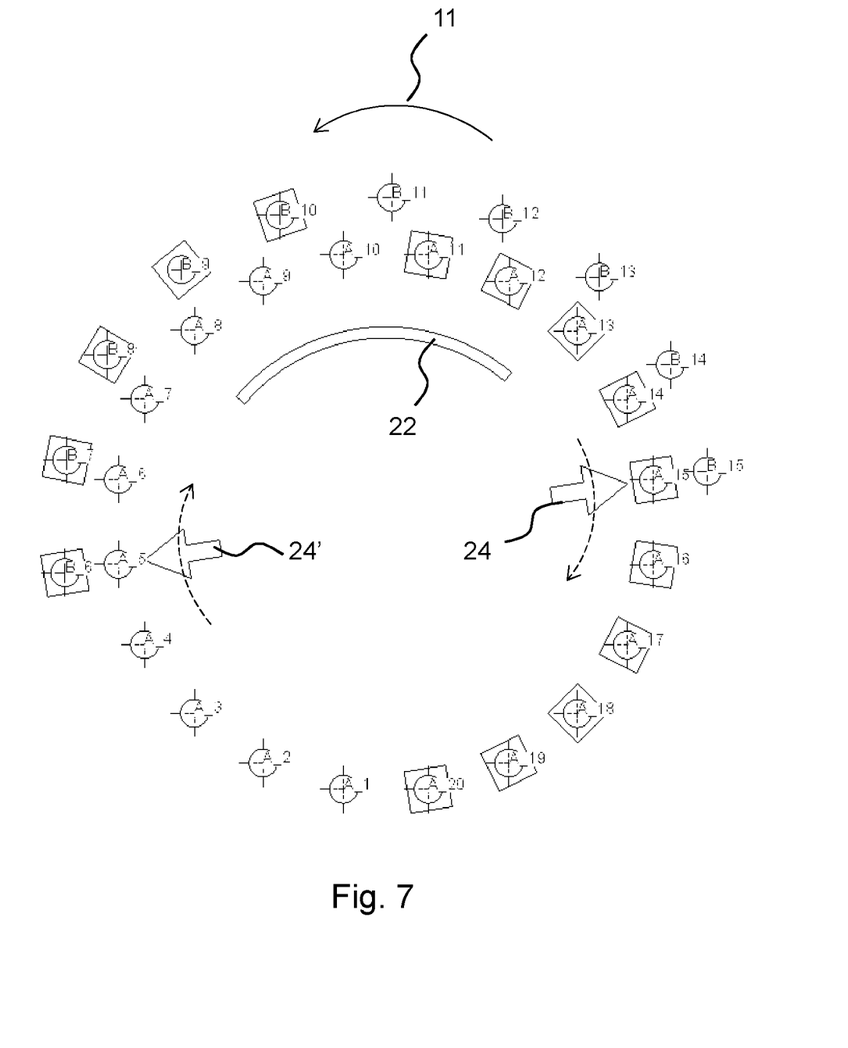

After an above-described successive transfer of a plurality of ten products from the first transport line 3 to the second transport line 4, the predefined track section 24 keeps rotating clockwise without transferring further products, as represented by the dashed arrows in FIG. 7, while the carriers A and B keep moving in the counter clockwise direction 11. Predefined track section 24 is now outside the range of the indicated part of the track 22 where it may transfer products. For the purpose of moving the track section 24 to an inactive position in which it does not engage the cam followers 18, the track section 24 may be provided in a movable manner with respect to the cam track 22. The track section 24 may be provided with a further cam follower that runs in a further cam track 26 as FIG. 1 shows. That further cam track 26 may be provided as part of a further disc which may be provided stationary. This means that in use, while the disc 28 rotates and thus also the track section 24 rotates, the track section 24 can be moved between the inactive position and an active position as a result of the further cam follower running through the further cam track 26 and such that the track section 24 may be moved to the inactive position when being upstream or downstream of the mentioned displayed part of the cam track 22 (in FIG. 2B; i.e. the part referenced by number 22), in which inactive position the section 24 is out of the range of cam followers 18 passing the section 24 to such an extent that the cam followers will not be engaged such as to transfer a product. The predefined track section 24 may be moved to the active position while passing through the displayed part of the cam track 22, the track section 24 in the active position thereof forming a bulging section of the cam track 22 so as to engage the cam followers 18 for the purpose of transferring a product.

Figure 8A:
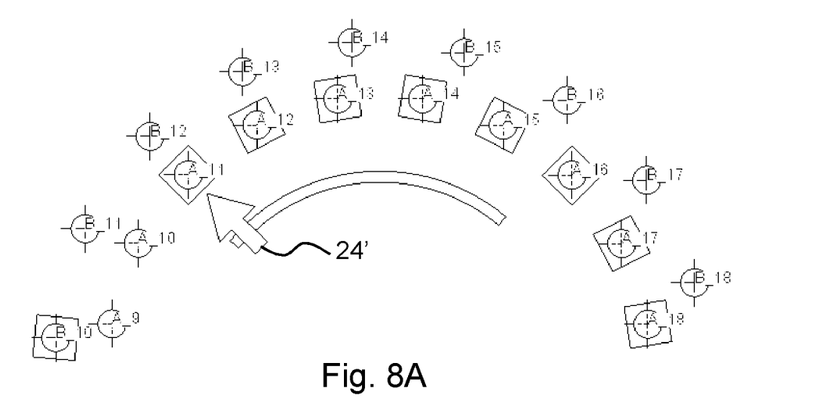
Figure 8B:
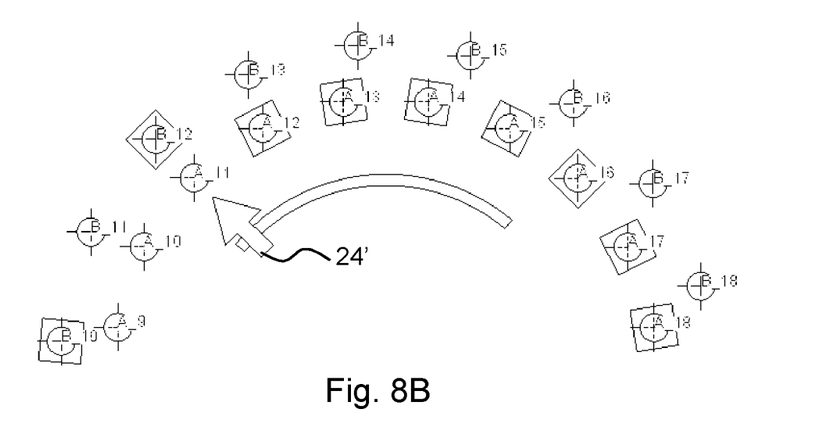

The transfer device 14 has two such predefined track sections 24, 24' as FIG. 7 shows, at 180 degrees from each other. While the right section 24 (in the view of FIG. 7) has thus just left the indicated track part of the track 22, the left section 24' already approaches said track part. A moment in time later the track section 24' is at the location displayed in FIG. 8A, which is the same as the above mentioned 'first location' and is ready to transfer a first product 8, from a successive plurality of ten products to be successively transferred, from carrier A_11 to carrier B_12. See also FIG. 8B. As FIG. 8B shows, carrier B_11 is left empty. Or, in other words, a gap has been created in the second transport line 4. After transferring that product 8 from carrier A_11 to carrier B_12, nine successive products will be transferred from respective first product carriers to respective second product carriers in the manner as described above, now as a result of the interaction between track section 24' and the cam followers 18. Then, two successive pluralities of each ten products have been transferred from the first to the second transport line. After that, one second product carrier B will be left empty again, just like it was the case with second product carrier B_11 as described above, and a third iteration of the transfer of ten products will commence, now again using track section 24.

Other variations to the disclosed embodiments can be understood and effected by those skilled in the art in practicing the claimed invention, from a study of the drawings, the disclosure, and the appended claims. The foregoing description provides embodiments of the invention by way of example only. The scope of the present invention is defined by the appended claims. One or more of the objects of the invention are achieved by the appended claims.

The invention claimed is:

1. A system for processing poultry slaughter products, comprising:
   a first transport line, running in use at a first speed, and comprising successive first product carriers spaced apart at a first distance along the first transport line and each configured to carry a respective one of the products,
   a second transport line, running in use at a second speed, and comprising successive second product carriers spaced apart at a second distance along the second transport line and each configured to carry a respective one of the products,
   a product transfer device for successively transferring products from respective first product carriers to respective second product carriers,
   wherein the product transfer device is configured such that it each time successively transfers a predefined plurality of products, wherein a location of transfer of a subsequent product of the predefined plurality of products is each time more upstream or is each time more downstream along the first transport line than the location of transfer of a previous product of the predefined plurality of products.

2. The system according to claim 1, configured such that in use the second speed is higher than the first speed, wherein the product transfer device is configured such that a location of transfer along the first and second transport lines of a subsequent product of the plurality of products is each time more upstream than that of a previous one of the plurality of products.

3. The system according to claim 1, wherein the second distance is greater than the first distance.

4. The system according to claim 1, wherein each of the successive transfers of a predefined plurality of products has an equal predefined plurality of products.

5. The system according to claim 4, wherein the location of transfer of a product of a subsequent predefined plurality of products is the same as the location of transfer of a product, having the same sequence number, of a preceding predefined plurality of products.

6. The system according to claim 1, wherein at least at the transfer device, both the first and the second transport line follow a curved path, such as defined by a carrousel, preferably wherein the second transport line is at an outer side of the first transport line.

7. The system according to claim 1, wherein the product transfer device comprises a cam follower coupled to a transfer element for engaging a product for transferring it from a first to a second carrier, the system having a cam track through which the cam follower runs in use, wherein the cam track is configured to move the cam follower at the respective location of transfer so as to initiate the transfer of a product from a first to a second carrier at that location.

8. The system according to claim 7, wherein the cam track has a predefined track section that moves the cam follower so as to initiate said transfer, wherein the system has a drive module configured to move the predefined track section upstream or downstream along the first transport line during each successive transfer of a said predefined plurality of products in use.

9. The system according to claim 8, wherein a cam follower is provided for each of the first carriers, and is connected thereto, and wherein further a transfer element is provided for each of the first carriers, and is connected thereto.

10. The system according to claim 7, wherein the transfer element is configured to engage the product by a pushing action.

11. A method for processing poultry slaughter products, using a system according to claim 1, the method comprising:
   transporting the products, using a first transport line running at a first speed and comprising successive first product carriers spaced apart at a first distance along the first transport line, wherein the products are each carried by a respective of the first product carriers; and
   successively transferring, by a product transfer device, products from respective first product carriers to respective second product carriers of a second transport line running at a second speed, the second product carriers being spaced apart at a second distance along the second transport line,
   wherein during the step of transferring, each time a predefined plurality of products are successively transferred wherein a location of transfer of a subsequent product of the predefined plurality of products is each time more upstream or is each time more downstream along the first transport line than the location of transfer of a previous product of the predefined plurality of products.

12. The method according to claim 11, wherein the second speed is higher than the first speed, wherein a location of transfer along the first and second transport lines of a subsequent product of the plurality of products is each time more upstream than that of a previous one of the plurality of products.

13. The method according to claim 11, wherein each of the successive transfers of a predefined plurality of products has an equal predefined plurality of products.

14. The method according to claim 11, wherein the cam track has a predefined track section that moves the cam follower so as to initiate said transfer, wherein the system has a drive module configured to move the predefined track section upstream or downstream along the first transport line during each successive transfer of a said predefined plurality of products in use, and wherein during the step of transferring, the predefined track section is moved upstream or downstream along the first transport line during each successive transfer of a said predefined plurality of products.

\* \* \* \* \*